(12) United States Patent
Yanagi

(10) Patent No.: US 8,967,312 B2
(45) Date of Patent: Mar. 3, 2015

(54) BATTERY PACK TRAY

(71) Applicant: Mitsubishi Jidosha Kogyo Kabushiki Kaisha, Tokyo (JP)

(72) Inventor: Kenji Yanagi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 42 days.

(21) Appl. No.: 13/940,735

(22) Filed: Jul. 12, 2013

(65) Prior Publication Data

US 2014/0014428 A1    Jan. 16, 2014

(30) Foreign Application Priority Data

Jul. 13, 2012  (JP) ................................. 2012-157229

(51) Int. Cl.
*B60R 16/04*      (2006.01)
*B60K 1/04*       (2006.01)
*H01M 2/10*       (2006.01)

(52) U.S. Cl.
CPC ............... *B60K 1/04* (2013.01); *H01M 2/1038* (2013.01); *H01M 2/1077* (2013.01); *H01M 2220/20* (2013.01); *B60K 2001/0438* (2013.01); *B60K 2001/0472* (2013.01)
USPC ........................................................ 180/68.5

(58) Field of Classification Search
CPC .. B60R 16/04; B60K 1/04; B60K 2001/0438; B60K 2001/0472; H01M 2/1077; H01M 2/1083; H01M 2/1038; H01M 2220/20
USPC ........................................... 180/68.5; 429/100
See application file for complete search history.

(56) References Cited

U.S. PATENT DOCUMENTS

| 4,365,681 | A | * | 12/1982 | Singh ........................... 180/68.5 |
| 5,390,754 | A | * | 2/1995 | Masuyama et al. .......... 180/68.5 |
| 5,501,289 | A | * | 3/1996 | Nishikawa et al. .......... 180/68.5 |
| 5,534,364 | A | * | 7/1996 | Watanabe et al. ............... 429/61 |

(Continued)

FOREIGN PATENT DOCUMENTS

| EP | 559176 A1 | * | 9/1993 | ............... B60K 1/04 |
| JP | 2008-174181 A | | 7/2008 | |

(Continued)

OTHER PUBLICATIONS

Extended European Search Report for European Application No. 13176018.3, dated Nov. 26, 2013.

*Primary Examiner* — Hau Phan
*Assistant Examiner* — Jacob Meyer
(74) *Attorney, Agent, or Firm* — Birch, Stewart, Kolasch & Birch, LLP

(57) ABSTRACT

A battery pack tray includes: a tray body including: a bottom which has a concave-convex portion that includes convex and concave portions which extend in a first direction; and a wall which is upward bent from a periphery of the bottom; reinforcement frames provided along opposed wall portions of the wall in a second direction perpendicular to the first direction; a cross member disposed on an upper surface of the concave-convex portion, and forming a first closed cross-section with the concave-convex portion, both end portions of the cross member being secured to the reinforcement frames; an inner cross member secured to an upper surface of the cross member, both end portions of the inner cross member being secured to the reinforcement frames; and attachment brackets secured to the reinforcement frames.

5 Claims, 7 Drawing Sheets

(56) References Cited

U.S. PATENT DOCUMENTS

| | | | |
|---|---|---|---|
| 5,639,571 A * | 6/1997 | Waters et al. | 429/71 |
| 5,948,298 A * | 9/1999 | Ijaz | 219/209 |
| 6,188,574 B1 * | 2/2001 | Anazawa | 361/695 |
| 6,218,041 B1 * | 4/2001 | Barbier et al. | 429/96 |
| 6,227,322 B1 * | 5/2001 | Nishikawa | 180/68.5 |
| 6,569,556 B2 * | 5/2003 | Zhou et al. | 429/88 |
| 6,632,560 B1 * | 10/2003 | Zhou et al. | 429/99 |
| 7,507,499 B2 * | 3/2009 | Zhou et al. | 429/99 |
| 7,533,748 B2 * | 5/2009 | Miyajima et al. | 180/68.5 |
| 7,610,978 B2 * | 11/2009 | Takasaki et al. | 180/68.5 |
| 7,654,352 B2 * | 2/2010 | Takasaki et al. | 180/68.5 |
| 7,824,797 B2 * | 11/2010 | Nishino et al. | 429/163 |
| 7,905,308 B2 * | 3/2011 | Abe et al. | 180/68.5 |
| 7,926,602 B2 * | 4/2011 | Takasaki | 180/68.5 |
| 7,931,105 B2 * | 4/2011 | Sato et al. | 180/68.5 |
| 7,997,368 B2 * | 8/2011 | Takasaki et al. | 180/68.5 |
| 8,012,620 B2 * | 9/2011 | Takasaki et al. | 429/100 |
| 8,079,435 B2 * | 12/2011 | Takasaki et al. | 180/68.5 |
| 8,210,301 B2 * | 7/2012 | Hashimoto et al. | 180/68.5 |
| 8,256,552 B2 * | 9/2012 | Okada | 180/68.5 |
| 8,276,697 B2 * | 10/2012 | Takasaki | 180/68.5 |
| 8,286,743 B2 * | 10/2012 | Rawlinson | 180/68.5 |
| 8,336,658 B2 * | 12/2012 | Rawlinson et al. | 180/68.5 |
| 8,393,427 B2 * | 3/2013 | Rawlinson | 180/68.5 |
| 8,397,853 B2 * | 3/2013 | Stefani et al. | 180/68.5 |
| 8,403,090 B2 * | 3/2013 | Fujiwara et al. | 180/68.5 |
| 8,464,817 B2 * | 6/2013 | Usami et al. | 180/68.5 |
| 8,511,412 B2 * | 8/2013 | Kawaguchi et al. | 180/68.5 |
| 8,833,499 B2 * | 9/2014 | Rawlinson | 180/68.5 |
| 8,835,033 B2 * | 9/2014 | Choi et al. | 429/100 |
| 8,859,126 B2 * | 10/2014 | Yamada | 429/100 |
| 2002/0102454 A1 * | 8/2002 | Zhou et al. | 429/88 |
| 2004/0033415 A1 * | 2/2004 | Chen et al. | 429/99 |
| 2005/0260488 A1 * | 11/2005 | Zhou et al. | 429/99 |
| 2008/0160394 A1 * | 7/2008 | Takasaki et al. | 429/96 |
| 2008/0173488 A1 * | 7/2008 | Takasaki | 180/68.5 |
| 2008/0173489 A1 * | 7/2008 | Takasaki | 180/68.5 |
| 2008/0190679 A1 * | 8/2008 | Sato et al. | 180/68.5 |
| 2009/0145676 A1 * | 6/2009 | Takasaki et al. | 180/65.1 |
| 2009/0152034 A1 * | 6/2009 | Takasaki et al. | 180/68.5 |
| 2009/0186266 A1 * | 7/2009 | Nishino et al. | 429/120 |
| 2009/0236162 A1 * | 9/2009 | Takasaki et al. | 180/68.5 |
| 2009/0242299 A1 * | 10/2009 | Takasaki et al. | 180/68.5 |
| 2010/0000816 A1 * | 1/2010 | Okada | 180/68.5 |
| 2010/0307848 A1 * | 12/2010 | Hashimoto et al. | 180/68.5 |
| 2011/0000729 A1 | 1/2011 | Schwarz et al. | |
| 2011/0262801 A1 * | 10/2011 | Schwab | 429/163 |
| 2011/0297467 A1 * | 12/2011 | Iwasa et al. | 180/65.31 |
| 2011/0297469 A1 * | 12/2011 | Usami et al. | 180/68.5 |
| 2012/0121962 A1 * | 5/2012 | Katayama et al. | 429/120 |
| 2012/0125704 A1 * | 5/2012 | Kawaguchi et al. | 180/68.5 |
| 2012/0129029 A1 | 5/2012 | Yi et al. | |
| 2012/0153682 A1 * | 6/2012 | Rawlinson et al. | 296/209 |
| 2012/0156539 A1 * | 6/2012 | Honjo et al. | 429/100 |
| 2012/0160583 A1 * | 6/2012 | Rawlinson | 180/68.5 |
| 2012/0161429 A1 * | 6/2012 | Rawlinson et al. | 280/801.1 |
| 2012/0161472 A1 * | 6/2012 | Rawlinson et al. | 296/187.08 |
| 2012/0164504 A1 * | 6/2012 | Takashina et al. | 429/99 |
| 2012/0223113 A1 * | 9/2012 | Gaisne et al. | 224/538 |
| 2012/0247850 A1 * | 10/2012 | Hashimoto et al. | 180/68.5 |
| 2012/0301765 A1 * | 11/2012 | Loo et al. | 429/100 |
| 2012/0312614 A1 * | 12/2012 | Fujiwara et al. | 180/68.5 |
| 2012/0321927 A1 * | 12/2012 | Loo et al. | 429/100 |
| 2013/0192914 A1 * | 8/2013 | Nakamori | 180/68.5 |
| 2013/0202936 A1 * | 8/2013 | Kosaki et al. | 429/99 |
| 2013/0229030 A1 | 9/2013 | Yamaguchi et al. | |
| 2013/0298586 A1 * | 11/2013 | Hwang et al. | 62/239 |
| 2014/0017538 A1 * | 1/2014 | Nakamori et al. | 429/99 |
| 2014/0193694 A1 * | 7/2014 | Hoshi et al. | 429/151 |

FOREIGN PATENT DOCUMENTS

| | | |
|---|---|---|
| JP | 2010-284984 A | 12/2010 |
| WO | WO 2012/063393 A1 | 5/2012 |

\* cited by examiner

VEHICLE ANTEROPOSTERIOR DIRECTION

BATTERY PACK TRAY

CROSS-REFERENCE TO RELATED APPLICATION(S)

This application is based upon and claims the benefit of priority from prior Japanese patent application No. 2012-157229, filed on Jul. 13, 2012, the entire contents of which are incorporated herein by reference.

BACKGROUND

The present invention relates to a battery pack tray constituting a battery pack for mounting a battery on a vehicle such as an electric vehicle or a hybrid vehicle.

In an electric vehicle which uses an electric motor as a driving source, or a hybrid vehicle which uses an electric motor and an engine as driving sources, a battery pack which houses batteries for supplying electric power to the motor is mounted.

In such a battery pack, a plurality of battery modules are housed in a battery housing member such as a battery pack tray.

JP-A-2010-284984 discloses a related art of a battery housing member such as a battery pack tray.

According to JP-A-2010-284984, a battery pan includes: a bottom surface potion on which batteries are to be placed; a wall portion which is upward bent from an outer peripheral edge portion of the bottom surface potion; a plurality of cross members which are coupled to the upper surface of the bottom surface potion, and in which the both ends are coupled to the wall portion; an outer peripheral frame which is continuous on the entire outer periphery of the wall portion; and a flange which is outward bent from the upper surface of the wall portion.

In the outer peripheral frame in the front of the battery pan, furthermore, a front stay which is to be coupled to a vehicle cross member is disposed in the entire intermediate portion of the battery pan in the vehicle width direction.

In the outer peripheral frame in each of the both sides of the battery pan, a side stay which is to be coupled to a vehicle side frame is disposed in the entire region from a front end portion to an intermediate portion in the vehicle anteroposterior direction.

The front and side stays are formed by bending a flat plate.

According to JP-A-2010-284984, however, the outer peripheral frame is attached to the entire outer periphery of the wall portion of the battery pan. The outer peripheral frame has a structure in which the outer peripheral frame outward projects from the outer periphery of the wall surface so as to maintain the strength and rigidity of the battery pan, and prevent rainwater churned by vehicle wheels from being directly sprayed to a joint portion between the battery pan and a cover attached to the upper surface of the battery pan.

Therefore, the shape of the outer peripheral frame has the strength and rigidity which are greater than those that are originally required in an outer peripheral frame. Consequently, the outer peripheral frame is heavy, and problematic in terms of material cost and handling.

In each of the front and side stays, moreover, one end is fixed to the outer peripheral frame, and the other end is fastened to the corresponding one of the vehicle cross and side members.

However, the dimension of the side frames in the vehicle width direction depends on the size and shape of the vehicle. As described above, the outer peripheral edge of the outer peripheral frame outward projects from the wall surface of the battery pan in a degree greater than required. Therefore, the relative distances between the outer peripheral edge of the outer peripheral frame, and the cross and side frames which are the attaching portions on the side of the vehicle body are short. As a result, there is a further problem in that a space in which a shape countermeasure for the strength and rigidity of the front and side stays is hardly ensured.

SUMMARY

The presently disclosed subject matter may provide a battery pack tray in which weight reduction is realized, and both the strength and the rigidity are improved The battery pack tray which constitutes a battery pack to be mounted on a vehicle may comprise: a tray body including: a bottom which has a concave-convex portion that includes a convex portion and a concave portion which extend in a first direction and on which a battery is to be placed; and a wall which is upward bent from a periphery of the bottom, the tray body having a substantially rectangular shape in a plan view; reinforcement frames provided along a pair of opposed wall portions of the wall in a second direction perpendicular to the first direction; a cross member disposed on an upper surface of the concave-convex portion, and forming a first closed cross-section with the concave-convex portion, both end portions of the cross member being secured to the reinforcement frames; an inner cross member secured to an upper surface of the cross member, both end portions of the inner cross member being secured to the reinforcement frames; and attachment brackets used for attachment to a vehicle body, and secured to the reinforcement frames, the attachment brackets projecting to an outside of the tray body in a projection direction.

Each of the reinforcement frames may include: an inner frame forming a second closed cross-section with the wall, at a side where the battery is to be placed; and an outer frame forming a third closed cross-section with the wall, at a position opposed to the inner frame across the wall.

In the inner cross member, a lower portion of a section shape may have an opening, and an end edge of the opening may be secured to the cross member, thereby forming a fourth closed cross-section, and both end portions of the inner cross member may be secured to the inner frames.

A position where one of the attachment brackets is attached to the outer frame may be located in a portion opposed to a range where the cross member and the inner frame are coupled to each other.

Each of the attachment brackets may include: an upper bracket formed with a recess in which a middle portion of a section is recessed along the projection direction, a tip end portion of the upper bracket formed with an attachment hole for attaching to the vehicle body, a basal end portion of the upper bracket coupled to the outer frame; and a lower bracket, one end portion of which forms a fifth closed cross-section with the recess in a range from a middle portion in the projection direction of the upper bracket to the basal end portion, and the other end portion of which is secured to a portion of the outer frame where the outer frame is joined to the tray body.

DETAILED DESCRIPTION OF EXEMPLARY EMBODIMENTS

Hereinafter, an embodiment of the invention will be described in detail with reference to the figures. However, it should be understood that the dimensions, materials, shapes, relative placements, and the like of components in the embodiment do not limit the scope of the invention to them unless they are definitely described, and they are mere examples in the description.

When the direction of front, rear, right, left, up, or down is to be indicated, the direction is described with reference to the state where the driver takes the seat.

Figure 1:
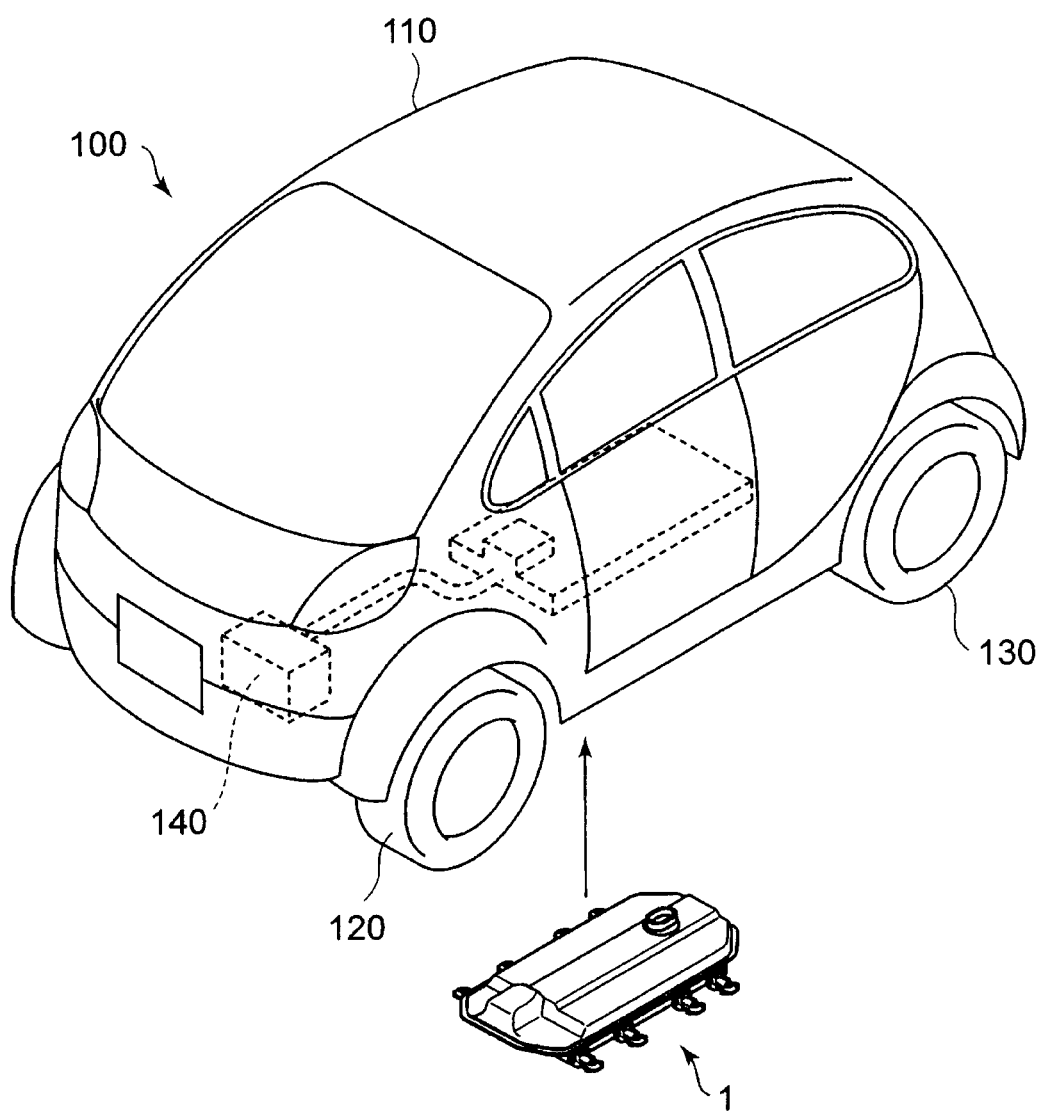
FIG. 1 is an external view of an electric vehicle in an embodiment of the invention.

FIG. 1 is an external perspective view of an electric vehicle 100 in which the embodiment of the invention is used.

In the electric vehicle 100, a battery pack 1 is attached to an intermediate portion in a vehicle width direction between the front and rear wheels 120, 130 of the vehicle body 110.

A controller 140 is connected to the battery pack 1 so as to perform a power supplying control in which electric power from batteries is supplied to driving motors via an inverter to control the driving force of the electric vehicle 100, a charging control in which deceleration energy is subjected to regeneration and the batteries are charged, and the like.

The battery pack 1 is detachably attached from the lower side of the electric vehicle 100.

The embodiment can be applied also to an electric vehicle, a hybrid vehicle, and the like. Hereinafter, an electric vehicle, a hybrid vehicle, and the like are therefore generally referred to as "vehicle."

Figure 2:
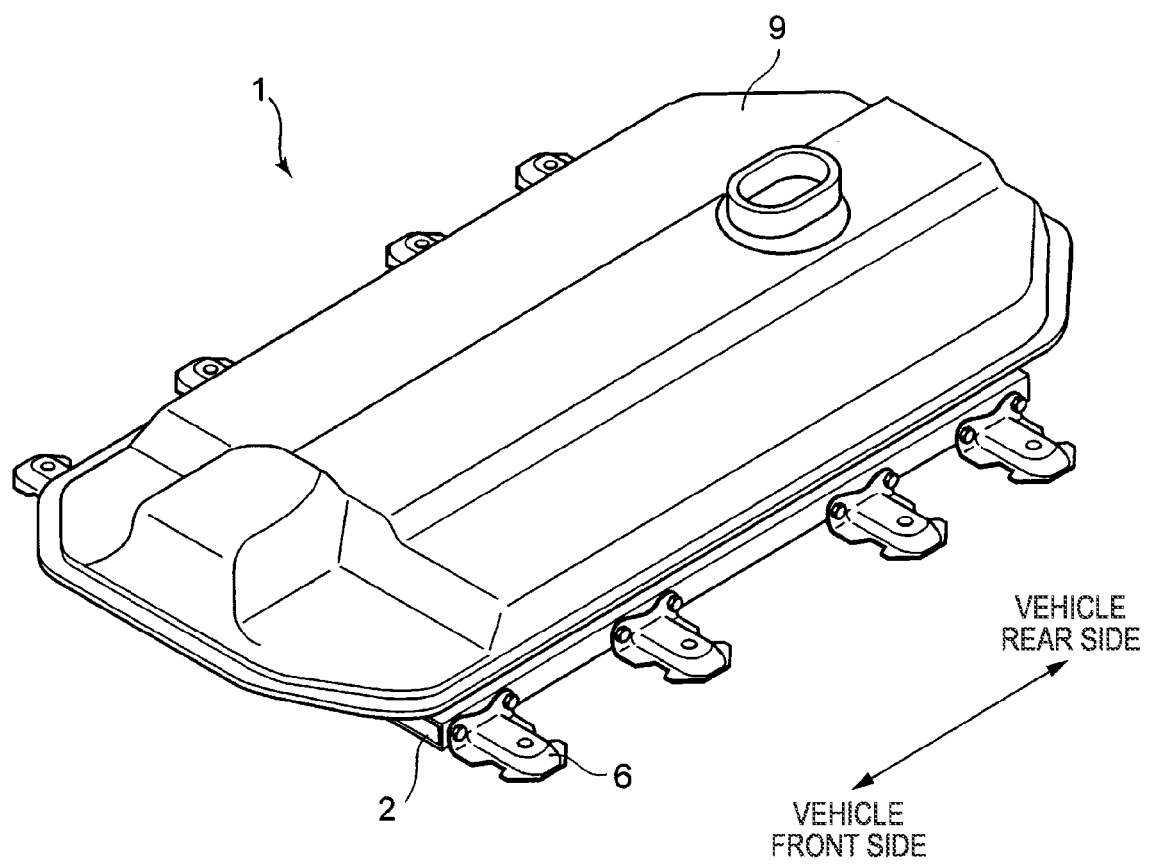
FIG. 2 is an external perspective view of a battery pack in the embodiment of the invention.

As shown in FIG. 2, the battery pack 1 that, in a plan view, has a substantially rectangular shape which is elongated in a vehicle anteroposterior direction is configured by: a battery pack tray 2 on which battery modules 11 are placed; a cover device 9 which protects the battery pack tray 2 so that water and dust do not enter therein; an interconnection circuit device (not shown) which interconnects the batteries in the battery pack tray 2.

Each of the battery modules 11 is a device in which, for example, eight battery cells are assembled into one unit while they are juxtaposed, and electrodes are connected in series.

Figure 3:
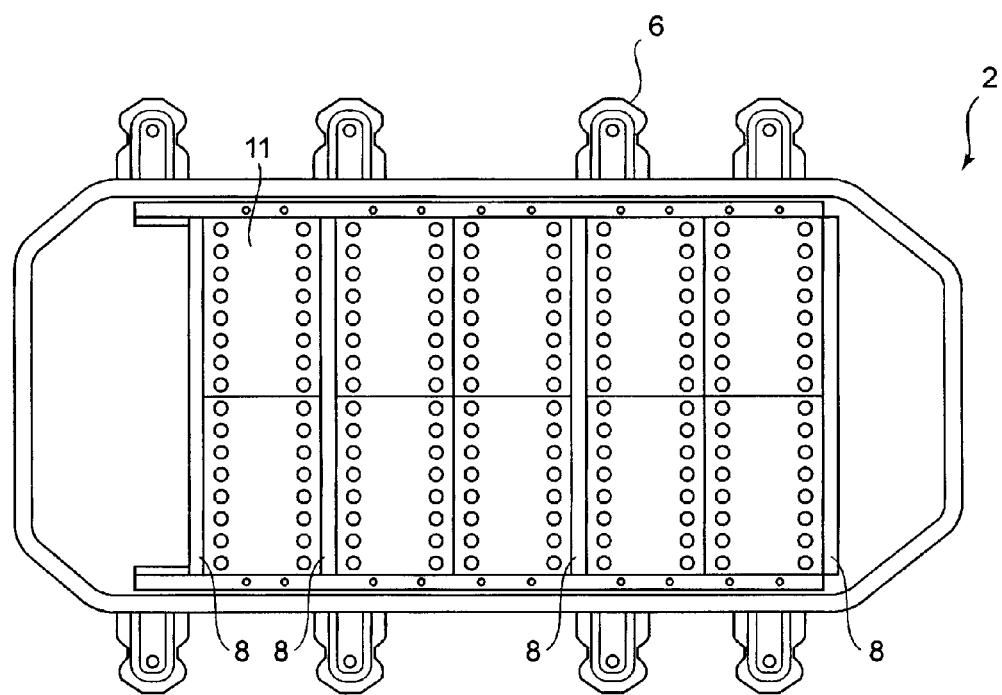
FIG. 3 is a view showing an example of a state where batteries are placed on a battery pack tray of the embodiment of the invention.

FIG. 3 shows a state where, in the battery pack tray 2, a total of ten battery modules 11 are regularly arranged in two rows in the vehicle width direction. Each of the rows consists of five battery modules. The battery modules 11 are connected to one another by the interconnection circuit device (not shown) to form an electric circuit. The circuit includes a circuit for connecting the battery modules in series to drive the electric vehicle 100, and a circuit for operating instruments, lamps, and the like which are required for travelling of the electric vehicle 100.

Figure 4:
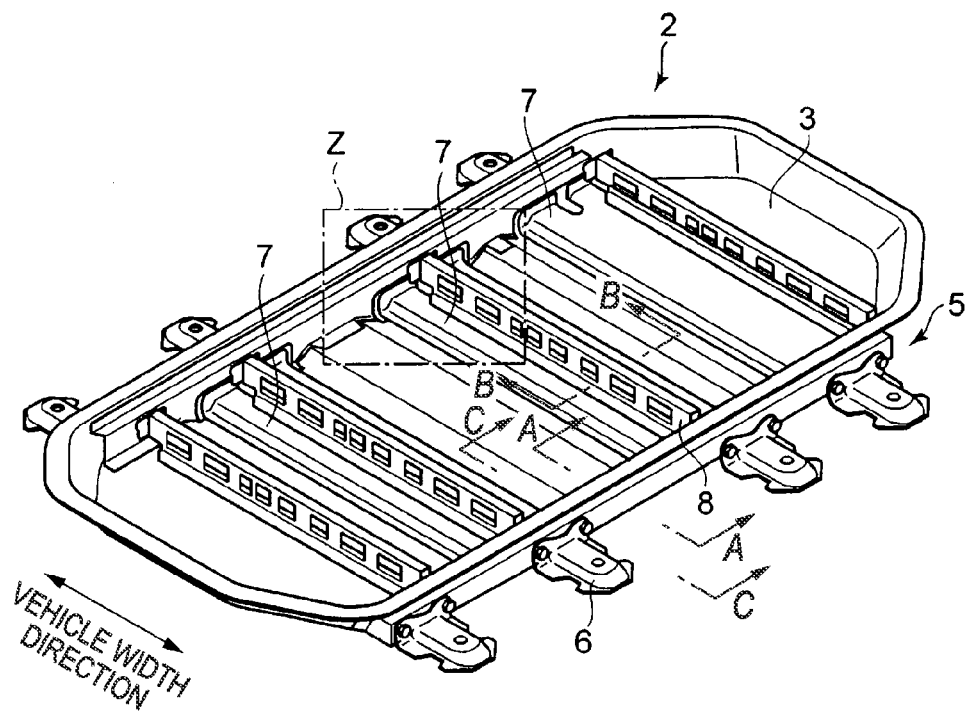
FIG. 4 is a perspective view of the battery pack tray of the embodiment of the invention.

FIG. 4 is an external perspective view of the battery pack tray 2.

The battery pack tray 2 is configured by: the tray body 3 on which the batteries are to be placed, and which has a substantially rectangular shape that is elongated in the vehicle anteroposterior direction in a plan view; reinforcement frames 5 which are disposed on the right and left sides of the tray body 3 along the outer peripheral portions of a longitudinal direction of the tray body 3, respectively; cross members 7 which are arranged on the side of the tray body 3 where the battery modules 11 are placed; inner cross members 8 which are attached to the upper surfaces of the cross members 7, respectively, which cooperate with the cross members 7 to improve the strength and rigidity of the battery pack tray 2, and which functions as partitions for the battery modules 11; and attachment brackets 6 which are secured to the reinforcement frames 5, and which are used for fixing the battery pack tray 2 to the vehicle body 110.

Figure 6:
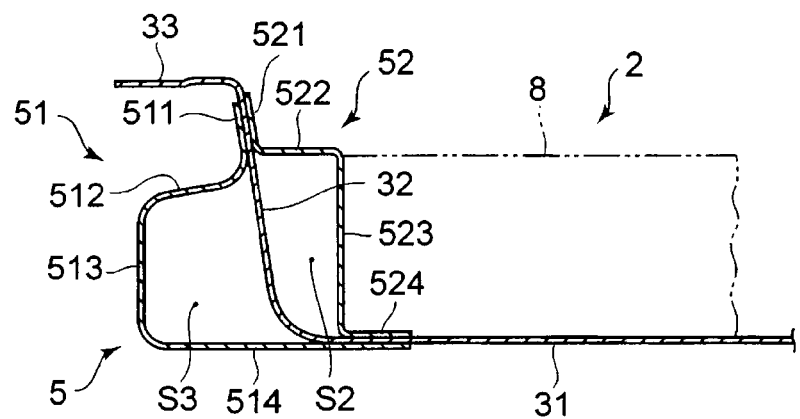
FIG. 6 is a sectional view taken along A-A in FIG. 4.

The tray body 3 has: a bottom 31 which is elongated in the vehicle anteroposterior direction in a plan view; a wall 32 which is upward bent form the peripheral edge of the bottom 31; and a flange 33 which outward extends from the upper edge of the wall 32 (see FIG. 6).

Figure 7:
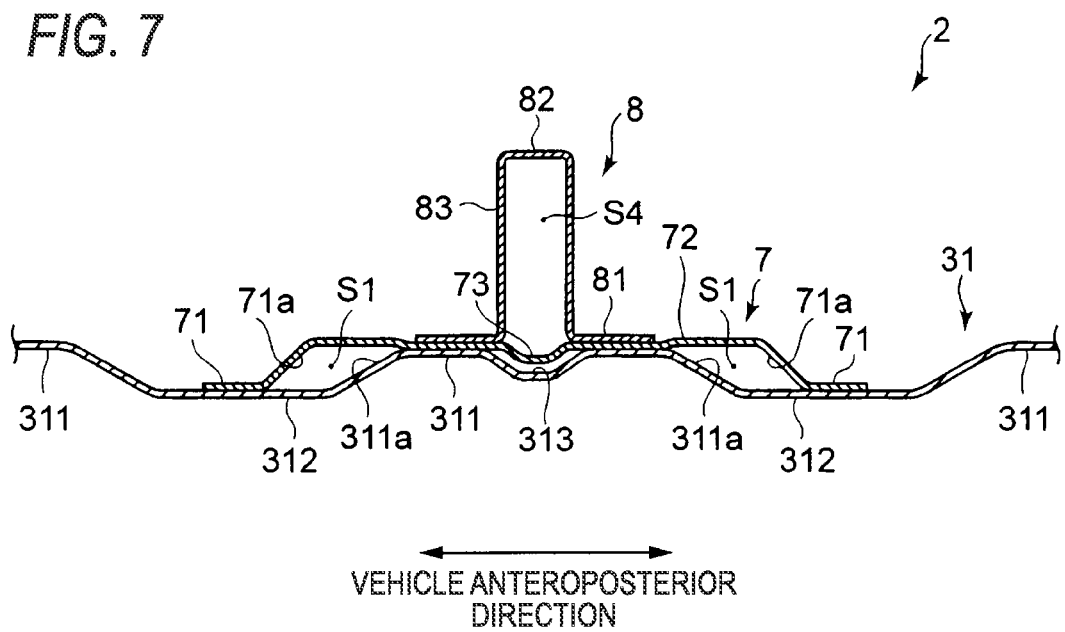
FIG. 7 is a sectional view taken along B-B in FIG. 4.

In the bottom 31 of the tray body 3, ridge-like convex and concave portions 311, 312 which are substantially rectangular in a plan view, which extend along the direction of the short sides, and which constitute a convex and concave portion having a trapezoidal sectional shape are alternately formed in the vehicle anteroposterior direction of the vehicle body 110 (see FIG. 7).

First beads 313 which downward project, and which extend along the convex portions 311 are formed in the middles of the convex portions 311 in the vehicle anteroposterior direction, respectively.

A pair of reinforcement frames 5 are disposed on walls 32 of the tray body 3 which are opposed to each other in the vehicle width direction.

FIG. 6 shows a section along A-A in FIG. 4 and in detail the sectional shape of each of the reinforcement frames 5.

The reinforcement frame 5 is configured by: an inner frame 52 which is joined to the inner peripheral surface of the corresponding one of the walls 32 of the tray body 3; and an outer frame 51 which is disposed on the outer peripheral surface of the wall 32, and at an opposed position across the wall 32.

As shown in FIG. 6, the inner frame 52 includes: an A-flange 521 in which an upper portion is secured to an upper portion of the wall 32; a bent wall 522 which is bent from the lower end of the A-flange 521 in the direction along which the bent wall is separated from the wall 32; a vertical wall 523 which extends from the bent wall 522 to the bottom 31 while maintaining the gap with respect to the wall 32; and a B-flange 524 which is bent from the vertical wall 523 along the bottom 31 toward the middle of the tray body 3, and which is secured to the bottom 31.

The inner frame forms a closed cross-section S2 which is a second closed cross-section.

The outer frame 51 includes: a C-flange 511 which is secured to the wall 32 at a position opposed to the A-flange 521 across the wall 32; a bent wall 512 which is bent from the lower end of the C-flange 511 in the direction along which the bent wall is separated from the wall 32; a vertical wall 513 which extends from the bent wall 512 to the outer side surface of the bottom 31 while maintaining the gap with respect to the wall 32; and a D-flange 514 which is bent from the lower end of the vertical wall 513 toward the wall 32, which extends to a position opposed to the B-flange 524, and which is secured to the outer side surface of the bottom 31.

The outer frame forms a closed cross-section S3 which is a third closed cross-section.

In the reinforcement frame 5, therefore, the inner frame 52 and the wall 32 form the closed cross-section S2, and the outer frame 51 and the wall 32 form the closed cross-section S3.

The outer frame 51 and the inner frame 52 have an integral shape in the state where they are opposed to each other across the wall 32. Even when twisting and bending forces act on the battery pack tray 2, therefore, the outer frame 51 and the inner frame 52 cooperate to maintain the rigidity and strength of the battery pack tray 2.

FIG. 7 shows a section along B-B in FIG. 4 and in detail the sectional shapes of the cross members 7 and the inner cross members 8.

As described above, the ridge-like convex and concave portions 311, 312 which are substantially rectangular in a plan view, which extend along the direction of the short sides, and which constitute the convex and concave portion having a trapezoidal sectional shape are alternately formed in the bottom 31 of the tray body 3.

Moreover, the first beads 313 which downward project, and which extend along the convex portions 311 are formed in the middles of the convex portions 311 in the vehicle anteroposterior direction, respectively.

Figure 5:
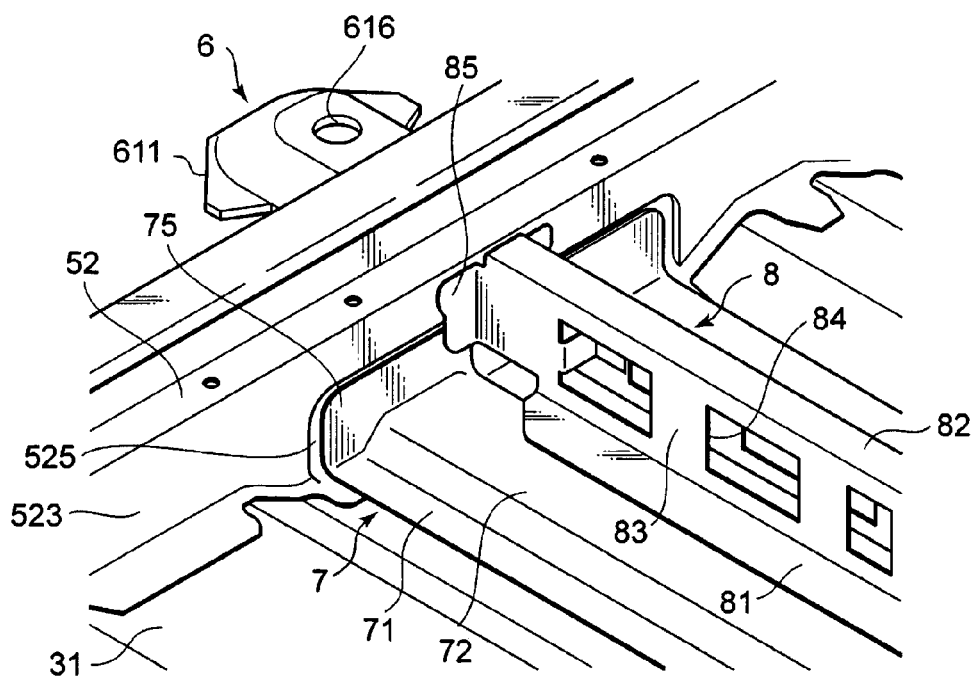
FIG. 5 is a detail view of the coupling structure of an inner frame, cross member, and inner cross member in the embodiment of the invention.

In each of the cross members 7, the section in the vehicle anteroposterior direction has a hat-like sectional shape, and the both ends in the vehicle width direction are secured to the vertical walls 523 of the inner frames 52, respectively (see FIG. 5).

In the hat-like section, the lower portion opens, and the width (in the vehicle anteroposterior direction) of the opening is wider than the width of the corresponding convex portion 311. E-flanges 71 outward extend from the both edges of the opening in the hat-like section.

The cross member 7 straddles the convex portion 311 of the tray body 3, the E-flanges 71 are secured to the middle portions of the front and rear concave portions 312 in the vehicle anteroposterior direction, respectively, and both end portions 311a of the convex portion 311 and both end portions 71a of the cross member 7 form closed cross-sections S1 which are first closed cross-sections.

In the middle of the top side 72 of the hat-like section, a second bead 73 which projects toward the corresponding first bead 313, and which is opposed to the first bead 313 is formed.

Therefore, the closed cross-sections S1 which are formed by the tray body 3 and the cross member 7, and the first and second beads enhance the strength and rigidity of this portion. Since the cross member 7 is on the side where the battery modules 11 are placed, moreover, rainwater does not intrude into the portions where the E-flanges 71 are secured. Therefore, a rust proofing process is not required, and the production cost can be reduced.

The structures of coupling the end portions of the cross member 7 and the inner cross member 8 in the vehicle width direction to the inner frame 52 will be described with reference to FIG. 5.

In each of the end portions of the cross member 7 in the vehicle width direction, an attachment flange 75 which is to be secured to the vertical wall 523 is formed by upward bending the top side 72 and the E-flanges 71 along the vertical wall 523 of the cross member 7.

In the vertical wall 523, a recess 525 corresponding to the thickness t of the attachment flange 75 is formed in a portion to which the attachment flange 75 is to be secured, so that, after the attachment flange 75 is joined to the recess 525 by spot welding or the like, the vertical wall 523 can maintain a flat surface.

The inner cross member 8 in which the lower portion opens, the opening straddles the second bead 73, and the section in the vehicle anteroposterior direction exhibits a hat-like shape is disposed along the second bead 73 of the cross member 7.

In the inner cross member 8, F-flanges 81 which outward extend from the edges of the opening are secured to the top side 72 of the cross member 7, and the inner cross member 8 having a hat-like section, and the second bead 73 form a closed cross-section S4 which is a fourth closed cross-section.

In each of the both ends of the inner cross member 8 in the vehicle width direction, G-flanges 85 which extend forward and rearward from the front and rear walls 83 of the hat-like section, respectively are secured both to the attachment flange 75 of the cross member 7 and to the vertical wall 523 of the inner frame 52.

In each of the height walls 83, a plurality of lightening holes 84 for reducing the weight are disposed in a middle portion of the height wall 83 in a vertical direction.

The top surface 82 of the inner cross member 8 is situated at a substantially same level as the bent wall 522 of the inner frame 52.

The structure in which the structures of the cross member 7 and the inner cross member 8 are integrated with each other is formed by securing the G-flanges 85 both to the attachment flange 75 and to the vertical wall 523.

According to the configuration, when twisting and bending forces act on the battery pack tray 2, the second moment of area and the section modulus can be enhanced, and the strength and rigidity which are larger than the value that is obtained by adding their rigidities together can be obtained.

The structure of the attachment brackets 6 for attaching the battery pack tray 2 to the vehicle body 110 will be described with reference to FIG. 8.

Each of the attachment brackets 6 is configured by: an upper bracket 61 in which the base end is attached to the vertical wall 513 (web portion), and an attachment hole 616 for attaching the tray body to the vehicle body 110 is formed in another end portion; and a lower bracket 62 in which one end portion is secured to the D-flange 514 of the outer frame 51, and the other end portion is secured to the lower surface of the upper bracket 61 in a range from an intermediate portion in the projection direction to the basal end side, to cooperate with the upper bracket 61 to form a closed cross-section S5.

The section of the upper bracket 61 in the vehicle anteroposterior direction has a hat-like shape which downward opens, and which has H-flanges 611 that extend forward and rearward from the edges of the opening, respectively.

The basal end side of the upper bracket 61 is upward bent along the vertical wall 513 of the outer frame 51, and fastened to weld nuts 515 which are fixed to the side of the third closed cross-section of the vertical wall 513 of the outer frame 51, by fixing bolts 615 through attachment holes disposed in the H-flanges 611 of the bent portion.

The section of the other end side of the lower bracket 62 in the vehicle anteroposterior direction has a hat-like shape which upward opens, and which has J-flanges 621 that extend forward and rearward from the edges of the opening, respectively.

A closed cross-section S5 which is a fifth closed cross-section is formed by securing the H-flanges 611 and the J-flanges 621 together.

In the above-described structure of the attachment bracket 6, when the weight of the batteries acts on the battery pack tray 2, therefore, a bending force in the Y-direction acts on the upper bracket 61, and then a tensile force in the X-direction acts on the lower bracket 62.

However, the closed cross-section S5 is formed in the vicinity of the portion where the upper bracket 61 is attached to the outer frame 51. Therefore, the attachment bracket 6 is prevented from being upward deformed, and the rigidity and strength can be ensured.

Figure 8:
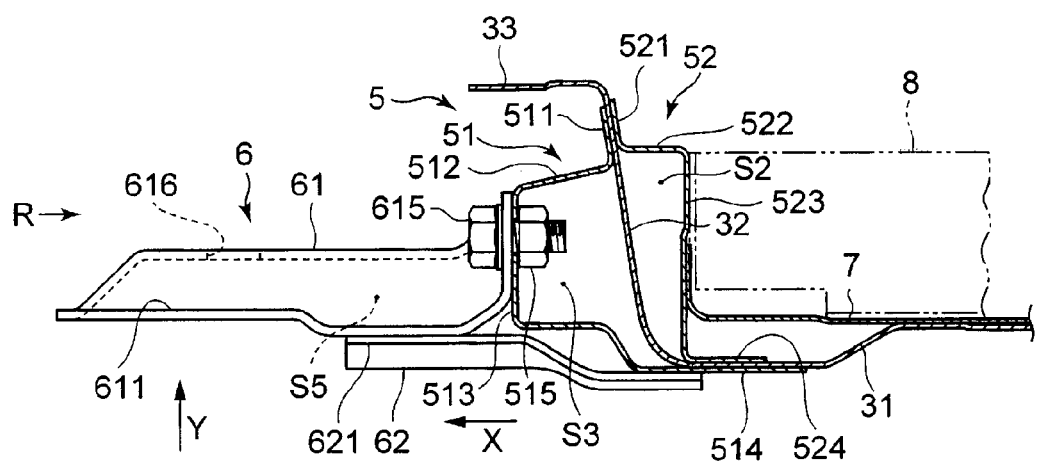
FIG. 8 is a sectional view taken along C-C in FIG. 4.
Figure 9:
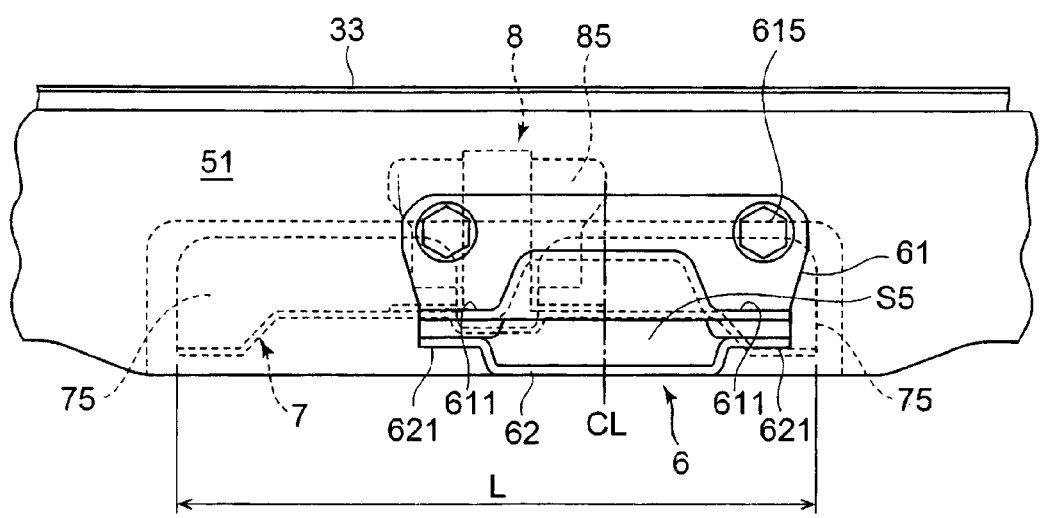
FIG. 9 is an end view looking in the direction of the arrow R in FIG. 8.

FIG. 9 shows an end view looking in the direction of the arrow R in FIG. 8. The width of the cross member 7 in the vehicle anteroposterior direction is elongated, and in accordance with this the attachment flange 75 of the cross member 7 where the inner frame 52 and the cross member 7 are coupled to each other is set as a coupling range L which is wide in the vehicle anteroposterior direction.

When the attachment bracket 6 is placed within the coupling range L, it is possible to prevent twisting due to the offset amount in the vehicle anteroposterior direction between the attachment bracket 6, and the cross member 7 and the inner cross member 8, from occurring.

Therefore, the load applied to the cross member 7 and the inner cross member 8 is efficiently transmitted from the attachment bracket 6 toward the vehicle body 110, and the strength and rigidity as the battery pack tray 2 can be easily obtained.

With respect to the attachment range of the attachment bracket 6, when the center CL of the attachment bracket 6 in the vehicle anteroposterior direction is within the coupling range L, twisting between the attachment bracket 6, and the cross member 7 and the inner cross member 8 can be prevented from occurring.

Moreover, the attachment flange 75 for attaching the cross member 7 to the inner frame 52 is elongated in the vehicle anteroposterior direction (the dimension L). Therefore, the attachment range on the side of the vehicle body has a margin, and the attachment position on the side of the vehicle body 110 can be easily located at the position which is optimum from the viewpoint of the vehicle body structure.

In the battery pack tray 2 of the above-described embodiment, the wall 32 of the tray body 3 is sandwiched by the inner frame 52 and the outer frame 51, and the closed cross-sections S2, S3 are formed on the both sides of the wall 32. Therefore, the rigidity of the wall 32 of the tray body 3 is improved, and the vertical and torsion rigidities of the reinforcement frame 5 are improved. As a result, the batteries can be surely held in a stable state.

Moreover, the structure is employed in which the cross member 7 and the inner cross member 8 are disposed on the side of the surface mounting the battery modules 11 in the tray body 3. Therefore, rainwater intrusion from the outside into the joining surfaces between the tray body 3 and the cross member 7, and the cross member 7 and the inner cross member 8 can be prevented from occurring.

Therefore, these portions do not rust, and the endurance reliability of the battery pack tray is improved. Moreover, a rust proofing process (application of sealant) is not required, and the production cost can be reduced.

Moreover, the structure is employed in which the cross member and the concave-convex portion of the bottom form the first closed cross-section S1, the inner cross member 8 is disposed on the upper surface of the cross member 7, and both their side portions are coupled to the reinforcement frame 5. Therefore, the weight (load) of the mounted battery modules 11 acts as a tension on the whole bottom of the tray body 3, so that stresses generated in portions of the battery pack tray 2 are suppressed. As a result, the rigidity and durability of the battery pack tray 2 can be improved.

According to an aspect of the invention, the structure is employed in which the cross members and the inner cross members are disposed on the side of the battery mounting surface of the tray body. Therefore, joining surfaces between the tray body and the cross members, and the cross members and the inner cross members exist inside the tray body. Consequently, rainwater intrusion from the outside can be prevented from occurring without particularly disposing a rainwater intrusion preventing structure.

Therefore, rainwater does not intrude into the joining surfaces, and the endurance reliability of the battery pack tray is improved. Moreover, a rust proofing process (application of sealant) is not required, and the production cost can be reduced.

Moreover, the structure is employed in which the cross members and the concave-convex portion of the bottom form the first closed cross-sections, the inner cross members are disposed on the upper surfaces of the cross members, and both their side portions are coupled to the reinforcement frames. Therefore, the weight (load) of the mounted battery modules acts as a tension on the whole bottom of the tray body, so that stresses generated in portions of the battery pack tray are scattered. As a result, the rigidity and durability of the battery pack tray are improved.

According to an aspect of the invention, the wall of the tray body is sandwiched by the inner frame and the outer frame, and the closed cross-sections are formed on the both sides of the wall. Therefore, the rigidity of the wall of the tray body is improved, and the vertical and torsion rigidities of the reinforcement frame are improved. As a result, the battery modules can be surely held in a stable state.

According to an aspect of the invention, the fourth closed cross-section is formed above the cross member, and hence the rigidity and durability of the battery pack tray are further improved.

According to an aspect of the invention, the positions where the attachment brackets are attached to the outer frame are substantially opposed to the cross member and the inner cross member. Therefore, the offset amount between the positions of the cross member and the inner cross member in the vehicle anteroposterior direction, and the position of the attachment bracket in the vehicle anteroposterior direction is reduced, so that the reinforcement frame is prevented from being twisted and the efficiency of load transmission from the reinforcement frame to the vehicle body is improved. As a result, the strength and rigidity of the battery pack tray can be easily attained.

According to an aspect of the invention, the outer-frame side of the attachment bracket is formed into a closed cross-section structure. Therefore, the battery pack tray on which heavy batteries are mounted can be firmly attached to the vehicle body, so that the battery pack tray can be prevented from vibrating, and a stress which may be generated in the portions where the battery pack tray is attached to the vehicle body can be suppressed.

According to an aspect of the invention, it is possible to obtain a battery pack tray in which weight reduction is realized, and both the strength and the rigidity are improved.

The invention can be used as a battery pack tray for mounting batteries on a vehicle such as an electric vehicle or a hybrid vehicle.

What is claimed is:
1. A battery pack tray which constitutes a battery pack to be mounted on a vehicle, the battery pack tray comprising:

a tray body including: a bottom which has a concave-convex portion that includes a convex portion and a concave portion which extend in a first direction and on which a battery is to be placed; and a wall which is upward bent from a periphery of the bottom, the tray body having a substantially rectangular shape in a plan view;

reinforcement frames provided along a pair of opposed wall portions of the wall in a second direction perpendicular to the first direction;

a cross member disposed on an upper surface of the concave-convex portion, and forming a first closed cross-section with the concave-convex portion, both end portions of the cross member being secured to the reinforcement frames;

an inner cross member secured to an upper surface of the cross member, both end portions of the inner cross member being secured to the reinforcement frames; and attachment brackets used for attachment to a vehicle body, and secured to the reinforcement frames, the attachment brackets projecting to an outside of the tray body in a projection direction.

2. The battery pack tray according to claim 1, wherein each of the reinforcement frames includes: an inner frame forming a second closed cross-section with the wall, at a side where the battery is to be placed; and an outer frame forming a third closed cross-section with the wall, at a position opposed to the inner frame across the wall.

3. The battery pack tray according to claim 2, wherein, in the inner cross member, a lower portion of a section shape has an opening, and an end edge of the opening is secured to the cross member, thereby forming a fourth closed cross-section, and both end portions of the inner cross member are secured to the inner frames.

4. The battery pack tray according to claim 2, wherein a position where one of the attachment brackets is attached to the outer frame is located in a portion opposed to a range where the cross member and the inner frame are coupled to each other.

5. The battery pack tray according to claim 2, wherein each of the attachment brackets includes:

an upper bracket formed with a recess in which a middle portion of a section is recessed along the projection direction, a tip end portion of the upper bracket formed with an attachment hole for attaching to the vehicle body, a basal end portion of the upper bracket coupled to the outer frame; and a lower bracket, one end portion of which forms a fifth closed cross-section with the recess in a range from a middle portion in the projection direction of the upper bracket to the basal end portion, and the other end portion of which is secured to a portion of the outer frame where the outer frame is joined to the tray body.

* * * * *